(No Model.)
C. W. HUBBARD.
ELECTRIC DETECTING APPARATUS FOR WATCHMEN.
No. 259,689. Patented June 20, 1882.
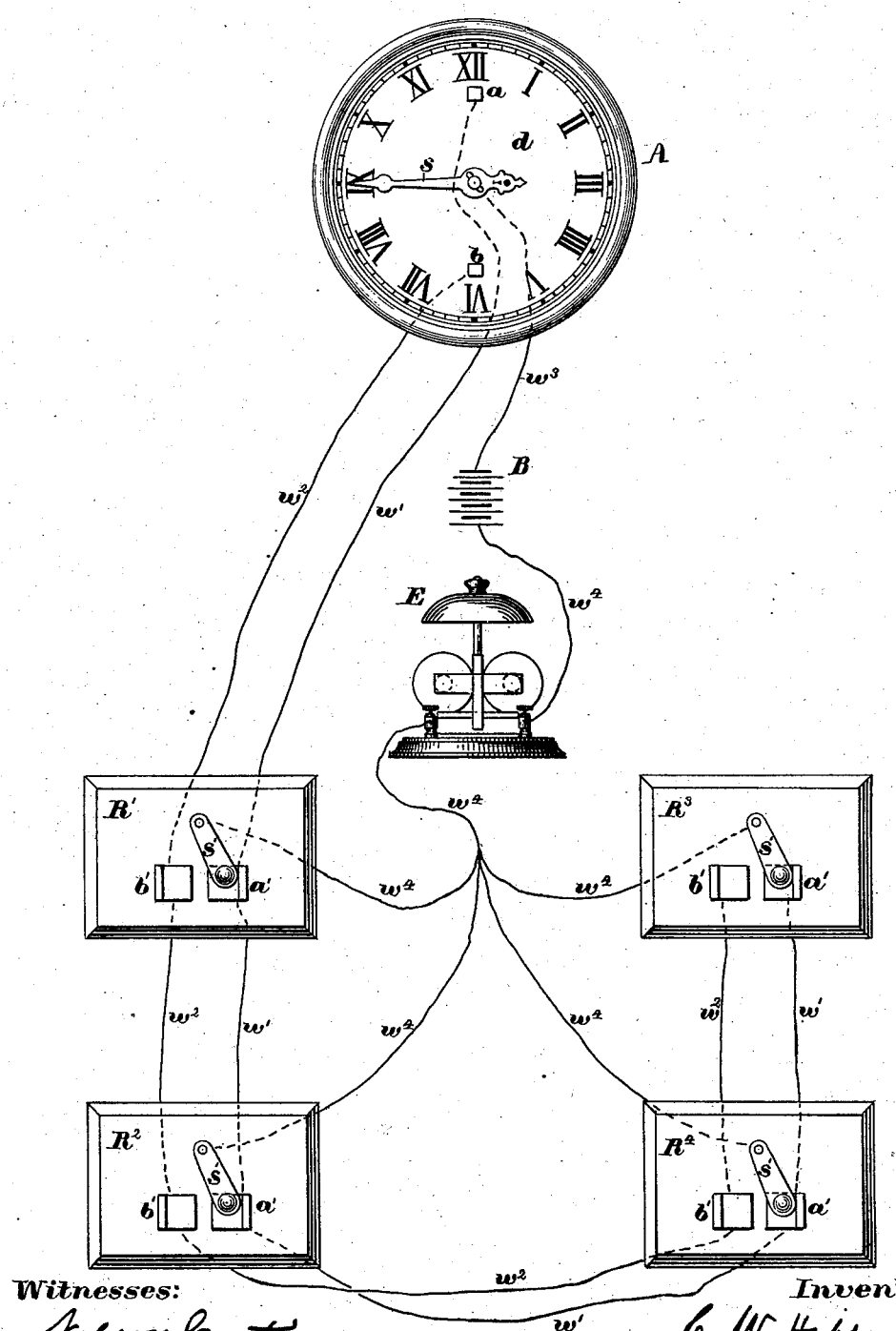
Witnesses:
Inventor:

UNITED STATES PATENT OFFICE.

CHARLES W. HUBBARD, OF BOSTON, MASSACHUSETTS.

ELECTRIC DETECTING APPARATUS FOR WATCHMEN.

SPECIFICATION forming part of Letters Patent No. 259,689, dated June 20, 1882.

Application filed December 5, 1881. (No model.)

*To all whom it may concern:*

Be it known that I, CHARLES W. HUBBARD, of Boston, in the State of Massachusetts, have invented a certain new and useful Improvement in Electric Detecting Apparatus for Watchmen, of which the following is a specification.

The invention consists in the combination, with an open electric circuit, an alarm or recording instrument in the circuit, an automatic circuit-closer, and suitable contact-points, of one or more switches, also in the circuit, the whole so arranged that when the automatic circuit-closer acts to close the circuit a signal will be given or a record made by that alarm or recording instrument unless the circuit be broken at each and every switch. The automatic circuit-closer has two contact-points, with each of which a pointer, revolved by a clock or other suitable mechanism, makes contact once in each revolution, and in each room which the watchman is required to visit there is a switch-board containing a switch to be operated by hand, and two contact-points, each of which is connected by wire with a separate contact-point of the automatic circuit-closer. The pointer of the automatic circuit-closer is connected by wire with one pole and the hand-switches are all connected by a wire or branches thereof with the other pole of a battery, there being an alarm or recording instrument in the circuit. If, then, the pointer of the automatic instrument makes contact with one of its contact-points while any one of the hand-switches remains in contact with a contact-point which is in connection with the said contact-point of the automatic instrument, the alarm will be given or a record made.

The accompanying drawing sufficiently illustrates the construction of apparatus embodying my invention, and serves for a diagram illustrating the mode of operation.

A is an automatic circuit-closer, consisting of two contact-points, $a$ and $b$, in a dial, $d$, and a pointer or circuit-closer proper, $s$, revolving by means of clock-work (not shown) behind the dial.

$R'$, $R^2$, $R^3$, and $R^4$ are switch-boards, one supposed to be in each of the rooms to be visited by the watchman, and each switch-board containing a hand-switch, $s'$, and two contact-points, $a'$ and $b'$.

The contact portion of each hand-switch is of such width that it must strike one of its contact-points before it leaves the other, and both contact-points of each switch-board have flanges at their outer edges, as shown, so that the switch cannot be cleared from both at any one time.

The contact-point $a$ of the automatic circuit-closer is connected by a wire, $w'$, with all the $a'$ contact-points of the several switch-boards, a wire, $w^2$, in like manner connecting the contact-point $b$ with all the $b'$ contact-points.

B is the battery, one pole of which is connected by wire $w^3$ with the pointer $s$ of the automatic instrument, while wire $w^4$, by means of branches, as shown, connects the other pole with all the switches $s'$.

E is an alarm or recording instrument in the circuit, as shown, and operated by an electro-magnet embodied therein in any ordinary manner.

It is obvious that when the pointer $s$ strikes the contact-pointer $a$ the circuit will be completed and an alarm given or a record made at the instrument E, if at that time any one of the $s'$ switches is on its $a'$ connecting-point, and that the same result will follow if any one of the $s'$ switches is on its $b'$ point $b$. The watchman accordingly must visit the several boards $R'$, $R^2$, $R^3$, and $R^4$ and move the switches from $a'$ to $b'$ while the pointer of the automatic circuit-closer is traveling from $b$ to $a$, and must visit them again and shift the switches from $b'$ to $a'$ while the pointer travels from $a$ to $b$.

The pointer may be made to revolve at any required rate of speed. In the apparatus illustrated it may be considered as having the rate of the minute-hand of a clock, and the watchman will be obliged to visit all the switch-boards once during each half-hour, or his neglect to do so will be made known by the apparatus.

I claim—

The combination, with an alarm or recording instrument, an electric circuit, and an automatic circuit-closer closing the circuit at regular intervals, of suitable contact-points and a series of hand-switches, substantially as described, so that an alarm will be given or a record made periodically unless the periodic action of the circuit-closer is counteracted by a corresponding periodic movement of all the switches.

CHARLES W. HUBBARD.

Witnesses:
J. G. AHEARNE,
W. W. SWAN.